(12) United States Patent
van de Ven

(10) Patent No.: US 7,962,679 B2
(45) Date of Patent: Jun. 14, 2011

(54) INTERRUPT BALANCING FOR MULTI-CORE AND POWER

(75) Inventor: Adriaan van de Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/863,715

(22) Filed: Sep. 28, 2007

(65) Prior Publication Data
US 2009/0089470 A1    Apr. 2, 2009

(51) Int. Cl.
G06F 13/24      (2006.01)
G06F 13/26      (2006.01)

(52) U.S. Cl. ......... 710/261; 710/266; 710/267; 710/268
(58) Field of Classification Search .................. 710/260
See application file for complete search history.

(56) References Cited

U.S. PATENT DOCUMENTS

| | | | |
|---|---|---|---|
| 6,738,847 B1* | 5/2004 | Beale et al. .................... 710/260 |
| 7,281,074 B2* | 10/2007 | Diefenbaugh et al. ........ 710/260 |
| 7,543,306 B2* | 6/2009 | Gaur ............................ 719/321 |
| 2003/0120702 A1* | 6/2003 | Jahnke ........................ 709/102 |
| 2003/0200250 A1* | 10/2003 | Kiick ........................... 709/102 |
| 2005/0204178 A1* | 9/2005 | Watts et al. .................... 713/320 |
| 2005/0254519 A1* | 11/2005 | Beukema et al. ............. 370/468 |
| 2006/0049843 A1* | 3/2006 | Jenkins et al. ................. 324/765 |
| 2006/0095624 A1* | 5/2006 | Raj et al. ....................... 710/260 |
| 2006/0112208 A1* | 5/2006 | Accapadi et al. ............. 710/265 |
| 2006/0112228 A1* | 5/2006 | Shen ............................ 711/133 |
| 2007/0043347 A1* | 2/2007 | Solomita et al. .............. 606/33 |
| 2007/0043970 A1* | 2/2007 | Solomita et al. ................ 714/10 |
| 2007/0143514 A1* | 6/2007 | Kaushik et al. ............... 710/260 |
| 2008/0005596 A1* | 1/2008 | Sistla et al. ................... 713/300 |
| 2008/0140895 A1* | 6/2008 | Baker et al. .................... 710/262 |

OTHER PUBLICATIONS

"Irqbalance—Google Code"; Dec. 9, 2006; available online at code.google.com.*
Gountanis, R.J. et al.; "A Method of Processor Selection for Interrupt Handling in a Multiprocessor System"; Proceddings of the IEEE; vol. 54 No. 12; Dec. 1966; pp. 1812-1819.*
First Office Action for Chinese Patent Application No. 200810176926.0, Mailed Aug. 30, 2010, 12 pages.

* cited by examiner

*Primary Examiner* — Ryan M Stiglic
(74) *Attorney, Agent, or Firm* — Blakely, Sokoloff, Taylor & Zafman LLP

(57) ABSTRACT

A method and apparatus for balancing power savings and performance in handling interrupts is herein described. When an amount of interrupt activity is above a threshold, a performance mode of interrupt handling is selected. During the performance mode, interrupts and/or interrupt sources are distributed among multiple physical sockets, i.e. multiple physical processors. However, if the interrupt activity is below a threshold for a number of periods, which denotes low interrupt activity, then a power save mode is selected. Here, interrupts and/or sources are primarily assigned to a single processor to allow other physical processors to save power. Furthermore, after interrupts are assigned to a physical processor, the interrupts may be further distributed among cache domains of the processor. In addition, high activity classes, interrupt sources, interrupts, or categories may be further assigned to specific processing elements for servicing.

27 Claims, 3 Drawing Sheets

INTERRUPT BALANCING FOR MULTI-CORE AND POWER

FIELD

This invention relates to the field of processors and, in particular, to providing quality and service to priority processing elements.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, threads, and/or logical processors.

Management functions in a computer system have become more prevalent with the increase in logic and functionality. Many processors utilize a management mode, such as System Management Mode (SM), to handle management tasks, such as networking, storage, and power tasks. Often, devices or sources that are requesting management initiate or generate interrupts. As the number of interrupts and interrupts grow from the rising level of functionality in a computer system, the burden on processors to perform these management tasks becomes more cumbersome.

Traditionally, even in a multi-processor system, interrupts are serviced by a single boot processor. Although, handling of interrupt sources by a single boot processor potentially saves power, as other processors in a multi-processor system may be able to remain in a low power mode, during high activity periods the other processors remain idle waiting for a single processor to service the interrupts.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific multi-processor configurations, types of interrupt sources, and implementation details etc. in order to provide a thorough understanding of the present invention. It will be apparent, however, to one skilled in the art that these specific details need not be employed to practice the present invention. In other instances, well known components or methods, such as different varieties of processors, interrupts, code implementations, and specific operational details of microprocessors, have not been described in detail in order to avoid unnecessarily obscuring the present invention.

The method and apparatus described herein are for balancing power and performance for interrupt handling. Specifically, balancing power and performance is primarily discussed in reference to a multi-processor computer system with each processor having multiple cores. However, the methods and apparatus for balancing power and performance are not so limited, as they may be implemented on or in association with any integrated circuit device or system, such as cell phones, personal digital assistants, embedded controllers, mobile platforms, desktop platforms, and server platforms, as well as in conjunction with any number of processors, such as one, with any number of processing elements, such as a core, hardware thread, software thread, logical processor, or other processing element.

Figure 1:
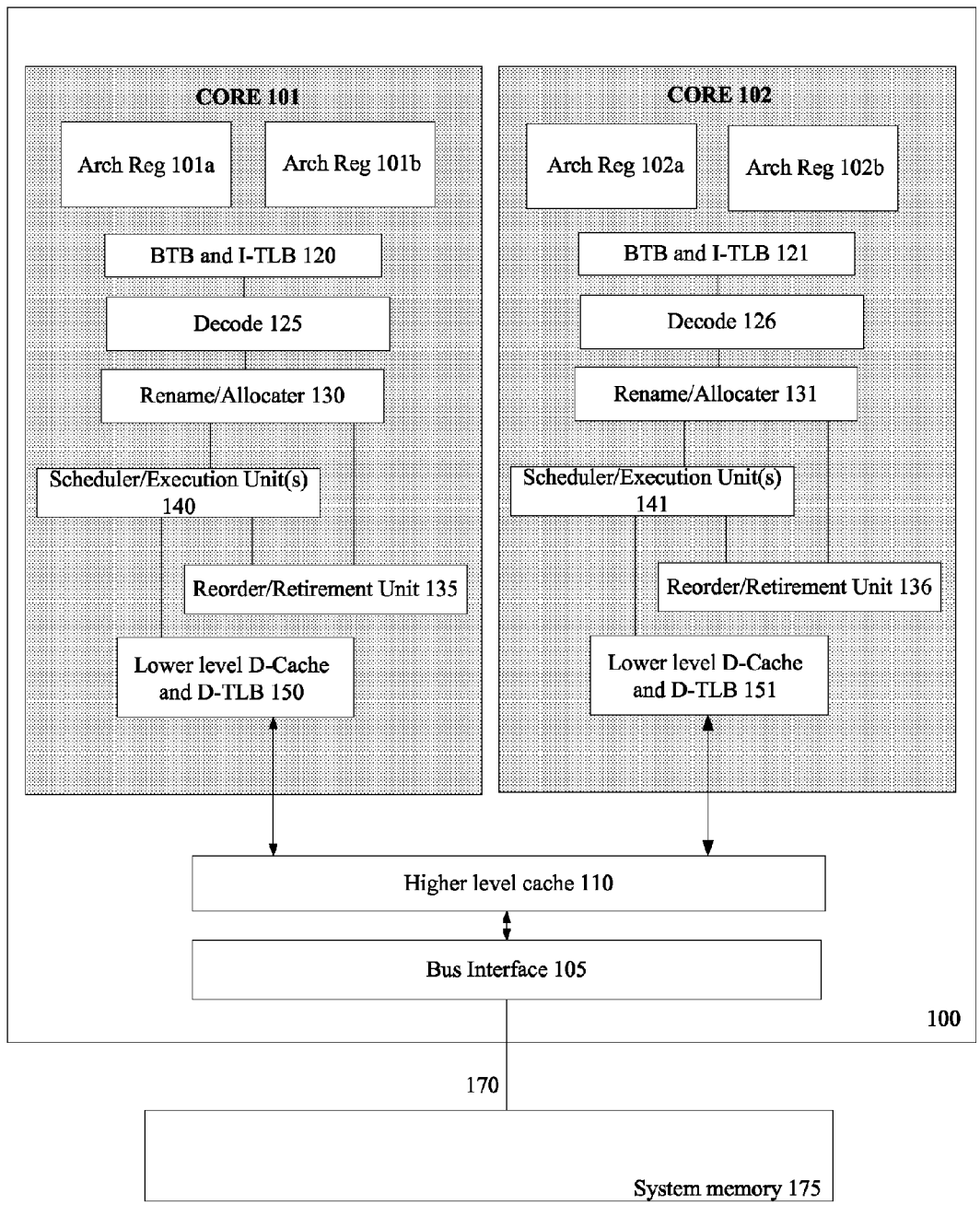
FIG. 1 illustrates an embodiment a multi-processing element processor capable of fairly distributing interrupts across processing elements.

Referring to FIG. 1, an embodiment of a multi-core processor capable of distributing interrupts among processing elements is illustrated. A processing element refers to a thread, a process, a context, a logical processor, a hardware thread, a core, and/or any processing element, which shares access to resources of the processor, such as reservation units, execution units, pipelines, and higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 110*a* and 101*b*, while core 102 includes two hardware threads 102*a* and 102*b*. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101*a*, a second thread is associated with architecture state registers 101*b*, a third thread is associated with architecture state registers 102*a*, and a fourth thread is associated with architecture state registers 102*b*. Reference to processing elements in processor 100, in one embodiment, includes reference to cores 101 and 102, as well as threads 101*a*, 101*b*, 102*a*, and 102*b*. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 110, execution unit(s) 140, and out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 1 70. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

In FIG. 1, processor 100 is illustrated as one physical microprocessor with two cores and four hardware threads. However, processor 100 is not so limited. In fact, as discussed in more detail below, in one embodiment, whether only a portion of the interrupt sources are distributed to processor 100 or all interrupt sources are assigned to processor 100, a first level of distribution within processor 100 is at a cache domain level. A cache domain includes any processing element that shares access to a cache. As discussed above, division at a cache domain may be done at any processing element level. For example, core 101 and 102 share access to cache 110. As a result, distribution of interrupt sources may be between cores. Furthermore, after distribution to cores, interrupts may be further distributed among local threads. In another embodiment, distribution is done between threads 101a, 101b, 102a, and 102b.

Therefore, processor 100 may include any number of processing elements, as well as cache domains. For example, processor 100 may include four cores, where the first two cores share access to a first level two data cache, i.e. a first cache domain, and the other two cores share access to a second level two data cache, i.e. a second cache domain. Even though discussion of physical processor 100 has focused on microprocessors, processor 100 may include any physical processing device, such as an embedded processor, cell-processor, microprocessor, or other known processor, which includes any number of multiple cores/threads.

Moreover, an oversimplified illustrative microarchitecture of an out-of-order of processor is illustrated for processor 100. However, any of the modules/units illustrated in processor 100 may be configured in a different order/manner, may be excluded, as well as may overlap one another including portions of components that reside in multiple modules. For example, a reservation unit may be distributed in processor 100 including multiple smaller reservation tables in different modules of processor 100.

Figure 2:
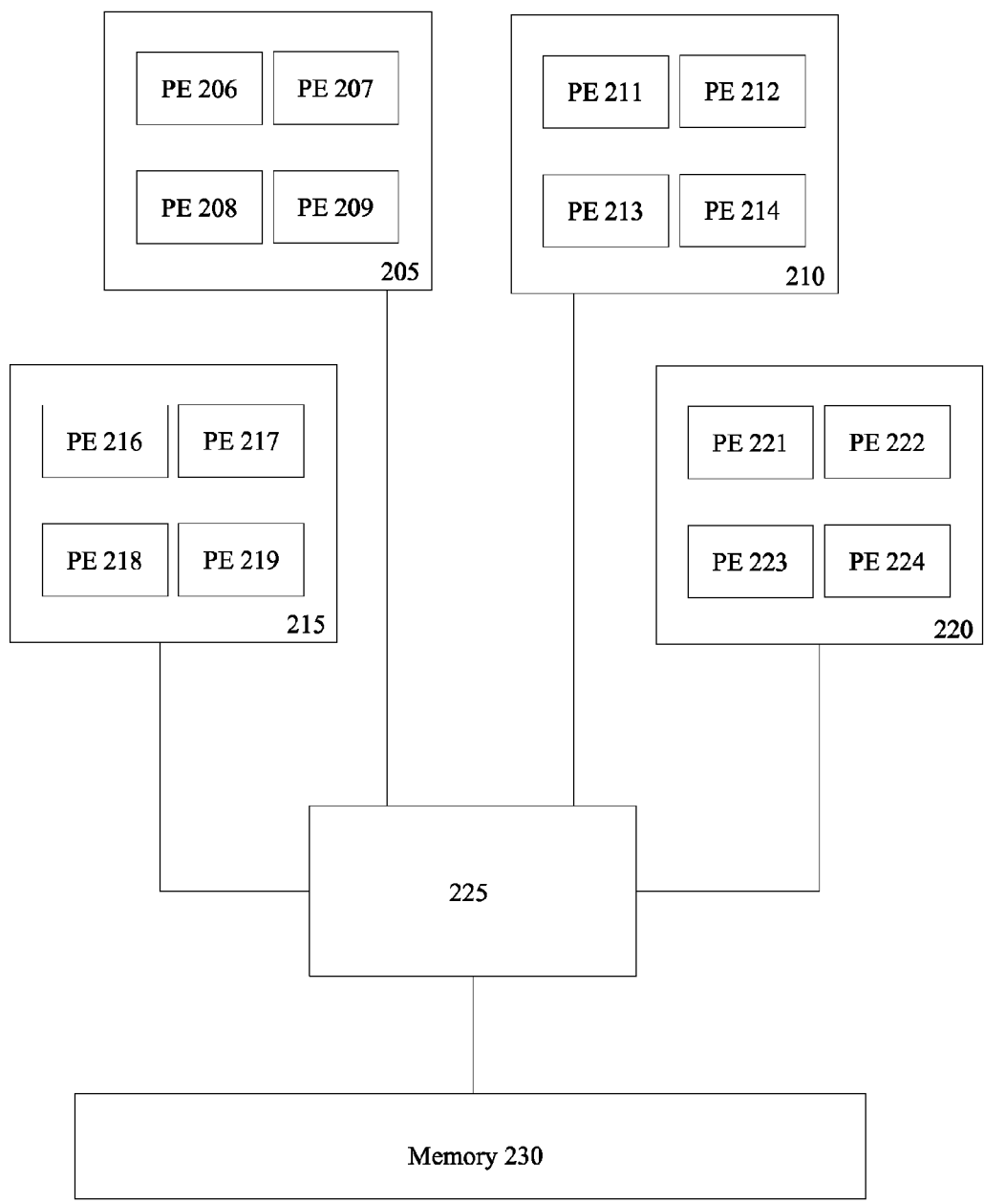
FIG. 2 illustrates an embodiment of a multi-processor system capable of fairly distributing interrupts among multiple processors during a performance mode of operation.

Turning to FIG. 2, an embodiment of a system capable of distributing interrupts is illustrated. System 200 includes four physical processing devices, i.e. processors 205, 210, 215, and 220. Physical processors 205, 210, 215, and 220 are coupled to a system memory 230 through a controller hub 225. As an example, controller hub 225 is a chipset device, including a memory controller hub coupled to interconnect controller hub. In another embodiment, controller hub 225 includes logic integrated in processors 205, 210, 215, and 220 to communicate with memory 230.

In another embodiment, processors 205, 210, 215, and 220 are coupled to controller hub 225 through direct interfaces, such as through a CSI or a quick path interface. Here, processors 205, 210, 215, and 220, as well as controller hub 225, include layered protocol stacks to provide for communication between devices. Although illustrative examples of configuring multiple processors in a system are described above, any configuration for including multiple physical processors in a system may be utilized.

Each of the processors as shown include four processing elements. For example, processor 205 includes processing elements (PEs) 206-209. In one embodiment, PEs 206-209 are cores. In another embodiment, PEs 206-209 include threads. Note that processors 210, 215, and 220 may be symmetric processors with similar components or asymmetric processors with different processing elements.

In on embodiment, system 200 is capable of determining an amount of interrupt activity during a period of time. As an example, the system is polled periodically by software to determine an amount of activity. To illustrate, every 10 seconds code, when executed, on a processor in system 200, calculates an amount of time spent in interrupt processing for the last 10 seconds. In another embodiment, an amount of interrupt activity includes an amount of interrupt events and/or sources during a period of time. For example, if there are a large number of devices/sources generating interrupts or a single device generating a large number of interrupts, a performance mode may be preferred Furthermore, a processor or other software, such as an operating system, may track interrupt statistics/information, which is utilized to determine an amount of interrupt activity.

Therefore, in one embodiment, when an amount of interrupt activity is over a threshold amount, a first mode of interrupt handling is selected. Here, since the interrupt activity is over a threshold, which denotes more interrupt activity, then the first mode is a performance mode. Note that a threshold may be varied and/or predetermined to provide optimum balancing between performance and power for interrupt handling. In fact, in the example above, during any single period, if the interrupt activity is above a threshold, then the performance period is selected. However, in a more conservative embodiment, a number of periods or consecutive periods where the amount of interrupt activity is over the threshold causes selection of a performance mode.

A performance mode refers to a mode of operation where interrupts and/or interrupt sources are distributed across processing devices/elements to efficiently service multiple interrupts and/or sources. In one embodiment, a performance mode includes distributing a plurality of interrupts among a plurality of integrated circuits or physical processors, such as processors 205, 210, 215, and 220. Previously, interrupts would be assigned to a single physical boot processor for handling. Although this allowed for other processors to enter power saving modes, a large amount of time may be spent handling large amounts of interrupts, which potentially adversely affects other software entity performance. Therefore, when an amount of activity is over a threshold, interrupts may be assigned/distributed among multiple processors to provide for faster handling of multiple interrupts.

In one embodiment, distribution of interrupts among a plurality of integrated circuits or physical processors, such as processors 205, 210, 215, and 220 is done based on fair distribution of interrupts and/or interrupt sources among the physical processors. For example, if there are four interrupts to be handled and system 200 is in a performance mode, then one interrupt may be assigned to processor processors 205, 210, 215, and 220, accordingly. In another embodiment, interrupt sources may be fairly distributed among processors 205, 210, 215, and 220. Here, classes or categories of interrupts may be assigned to processors 205, 210, 215, and 220. For example, networking interrupts are assigned to processor 205, power based interrupts are assigned to processor 210, storage interrupts are assigned to processor 215, and legacy interrupts are assigned to processor 220.

In another embodiment, interrupts may be assigned based on numa affinity, i.e. proximity of an interrupt or interrupt source to an integrated circuit. For example, an interrupt from a device physically closer to processor 220 may be biased towards being distributed/assigned to processor 220 to provide shorter distances for more efficient communication between the device and processor 220. Another factor for distribution of interrupts includes previous distribution of interrupt sources and/or interrupts to processors 205, 210, 215, and 220. For example, if a network interface controller (NIC) generated interrupt was serviced by processor 205, another interrupt generated by the NIC may be biased towards distribution to processor 205, as information may still be present to handle the interrupt faster.

Therefore, any combination of the factors above and other factors may be utilized for distribution of interrupts. In one embodiment, a bonus system is implemented to bias distribution based on multiple factors. Here, distribution is based on fair distribution, i.e. approximately even number of interrupts and/or interrupt sources. Furthermore, a bonus may be assigned to an interrupt or source that is assigned to the same processor that the source was previously assigned to or if an interrupt source is assigned to a processor that is closer in proximity than another processor. Note the bonus system may be graduated. For example, the largest bonus is given for assignment to a processor closest to an interrupt source, while a smaller bonus is given for every processor in proximity that is further away from the interrupt source. Inversely, a penalty system may be similarly utilized to bias towards retaining processor assignment, processor proximity, and previous processor assignment.

However, in less active periods of interrupt handling, it is potentially advantageous to limit interrupt assignment to primarily one processor, such as a boot processor, so that other processors may enter low power states. Therefore, in one embodiment, when an amount of interrupt activity is below a threshold for a period, then a second mode, such as a power save mode, of interrupt handling is selected. In another embodiment, to avoid thrashing between modes, the second power mode is selected after a number of consecutive periods of interrupt activity being below a threshold. For example, assume every 10 second the amount of interrupt activity is determined for the previous 10 seconds. As a result, if the amount of activity is over a threshold for a period then the performance mode is selected. However, a power save mode is not selected until three consecutive periods include interrupt activity below the threshold.

A power mode, as alluded to above, refers to a mode of interrupt handling where interrupts are primarily assigned to one processor, such as processor 205. To illustrate, assume three consecutive periods includes interrupt activity below a threshold; therefore, a power save mode was selected. During the power save mode, interrupts are primarily assigned to processor 205 for handling. As a result, processors 210, 215, and 220 may enter low power modes, such as sleep states, while processor 205 services the interrupts.

In one embodiment, interrupts are capable of being overflowed from processor 205 to processor 210. As stated above, power or performance mode is selected based on previous amounts of interrupt activity. Consequently, the current mode may be a power mode, but a large number of interrupts are generated/received. Here, if a number of interrupts and/or interrupt sources exceeds a threshold, then the amount exceeding the threshold are overflowed to processor 210. Processors 210, 215, and 220, in this example, are only utilized when needed to handle a large number of interrupts.

Whether interrupts are assigned to an integrated circuit, such as physical processor 205, from fair distribution during a performance mode or from primary distribution during a power mode, in one embodiment, interrupts and/or sources are distributed among cache domains. To illustrate, assume PEs 206 and 207 share access to a first cache domain and PEs 208 and 209 share access to a second cache domain. Here, the interrupts distributed/assigned to processor 205 are distributed among the first and the second cache domains. As above in reference to distribution among integrated circuits, distribution among cache domains may also be based on distribution factors, such as fair distribution between the cache domains, numa affinity, cache domain proximity, previously assigned cache domains, and other interrupt assignment factors.

Furthermore, a selective number of interrupts assigned to a cache domain may be further distributed or assigned to specific processing elements. In one embodiment, high rate or high activity interrupts/interrupt sources are selected to be further assigned to specific processing elements. In one embodiment a high rate interrupt includes a class or category of interrupt, such as a high priority interrupt class. Examples of high priority interrupt classes may include networking, timer, or specific device interrupts that potentially affect a user experience. However, any interrupt class or category may be determined to be a high rate or high priority class. In another embodiment, high activity interrupts include an amount of interrupt activity over a threshold.

To illustrate, during a performance mode, interrupt sources may be grouped into categories and/or classes, such as legacy, storage, timer, Ethernet, and other. These categories are distributed among processors 205, 210, 215, and 220 according to fair distribution of interrupt activity amount, numa affinity, and previous assignment. As a result, assume, during a performance mode, the Ethernet interrupts are assigned to processor 205, the storage and legacy interrupts are assigned to processor 210, the timer interrupts are assigned to processor 215, and the other interrupts are assigned to processor 220. Processor 205 further distributes the ethernet/networking interrupts among its cache domains, which here includes a first cache domain of PE 206 and 207 sharing one data cache and a second cache domain of PE 208 and 209 sharing a second data cache.

At this point, all interrupts may be serviced. However, in another embodiment, when the amount of Ethernet interrupt activity is over an Ethernet threshold, then selected Ethernet interrupt are further assigned specifically to PEs 206-209, accordingly. Note that each interrupt type, class, or category may have its own defined activity threshold. Therefore, on processor 210, legacy interrupts may have a lower threshold than storage interrupts. As a result, a smaller number of legacy interrupts may exceed a legacy threshold, while a larger number of storage interrupts may not exceed a storage threshold. Consequently, the legacy interrupts are further assigned to processing elements in processor 210, while the storage interrupts remain at a cache domain level of processor 210.

Figure 3:
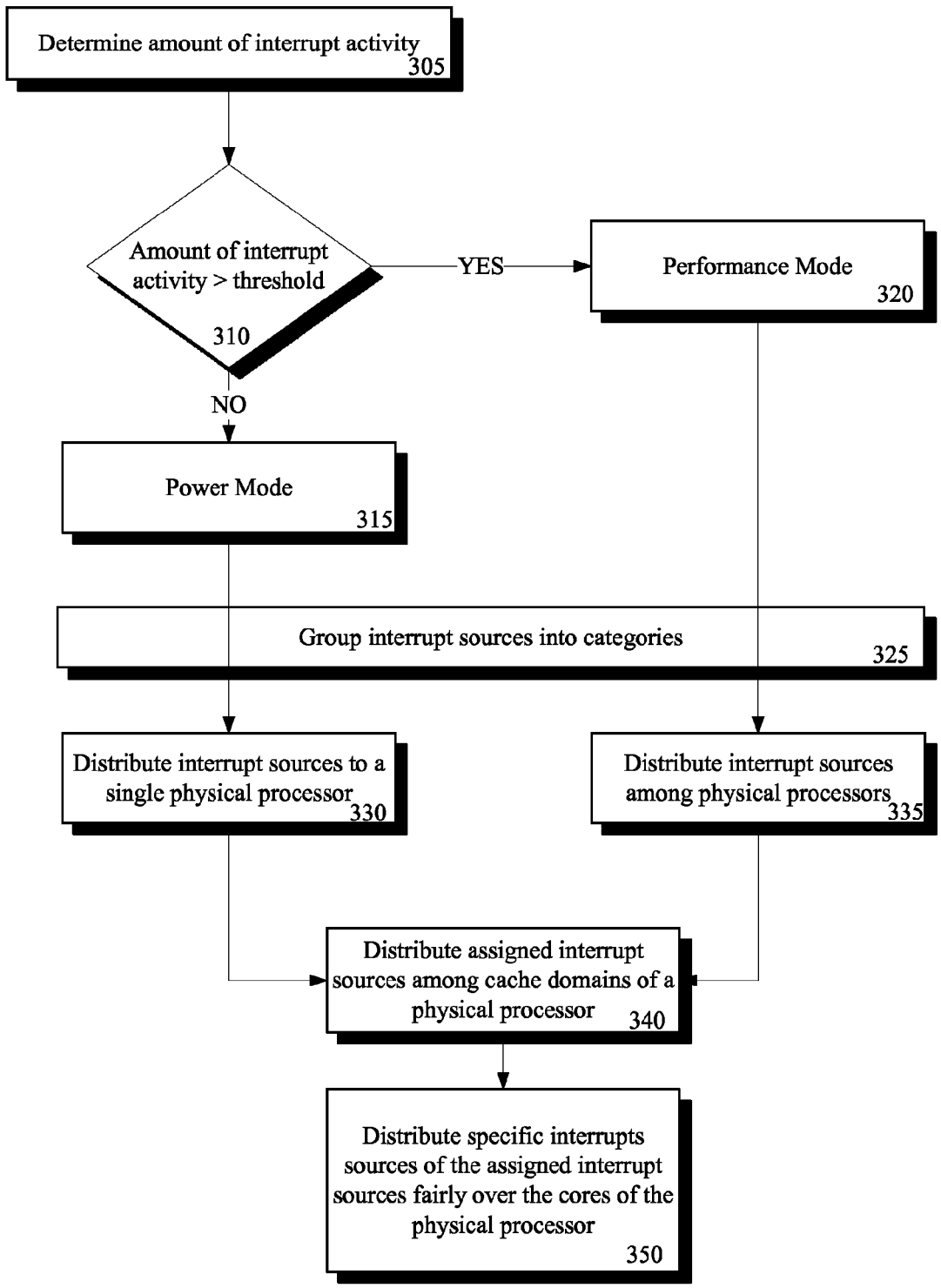
FIG. 3 illustrates an embodiment of a flow diagram for a method of balancing interrupt distribution among processors, cache domains, and processing elements.

Turning to FIG. 3, an embodiment of a flow diagram for a method of balancing performance and power for interrupt handling is illustrated. Although the described method is illustrated as a flow diagram, which typically illustrates operations/flows in a sequential manner, many of the operations may be performed in parallel or concurrently. In addition, the illustrated order of operations may be re-arranged.

In flow 305, an amount of interrupt activity is determined. In one embodiment, determining an amount of interrupt activity includes determining an amount of time spent handling interrupts in a period of time. Similarly, an amount of interrupt activity may include a number of interrupt events and/or sources over a period of time. Yet, determining an amount of interrupt activity may be done by and known method of tracking interrupts, processing time, or other interrupt metric.

Next, it is determined if an amount of activity is greater than a threshold in flow 310. Note, that it may instead be determined if the amount of activity is less than the threshold. The threshold value may be a predetermined value or other system/user set value. If the amount of activity is greater than the threshold, a performance mode is selected in flow 320. Inversely, if the amount of interrupt activity is less than the threshold, then a power mode is selected in flow 315. Alternatively, the performance mode remains selected until the amount of activity is less than a threshold for a number of periods. As an illustrative example, the amount is less than a threshold for three consecutive periods. Here, in flow 310 a variable may be used to track how many consecutive periods the amount of interrupt activity is less than the threshold. If the variable does not represent three consecutive periods below the threshold, then the flow returns to flow 305 for a next period with the performance mode selected. When the variable represents three consecutive periods below the threshold, then the power mode is selected in flow 315.

In one embodiment, whether in performance mode or power mode, interrupt sources are grouped into categories and/or classes. For example, interrupt sources may be grouped into Ethernet, networking, storage, timer, power, miscellaneous, or other category. Furthermore, the categories may be assigned classes or priorities. In another embodiment, interrupt sources are grouped only in performance mode for distribution. However, grouping of interrupt sources is optional, and may not be done before assigning or distributing interrupts to processors.

If performance mode is selected, then in flow 335 interrupt sources and/or interrupts are distributed among physical processors. In one embodiment, distributing among the physical processors is based on fair distribution. Here, sources or categories of sources may be assigned to different physical processors, but the over all number of interrupts and/or sources per processor are approximately equal. In addition, distribution may also be based on proximity of interrupt sources to physical processors, i.e. numa affinity, as well as previous assignment/mapping to physical processors. In one embodiment, a bonus method is utilized to bias distribution based on the aforementioned factors. For example, a bonus may be assigned for retaining association of Ethernet interrupts to a first physical processor/socket, which is close in proximity to an Ethernet device that generated the interrupts.

In contrast, if the amount of interrupt activity is below a threshold for a number of periods, then the interrupt sources are primarily distributed/assigned to a single physical processor. Note that due to design implementation, the number of periods may be any positive integer of periods. As an example, they be a percentage of periods, such as two out of the past three periods, as well as consecutive periods, such as two consecutive periods or three consecutive periods below the threshold.

In a processor system with more than one physical processor, the single processor to be assigned the interrupt sources in the power save mode is likely to receive interrupt sources in either mode. Therefore, flows 340-350, in one embodiment, are the same for a physical processor that receives interrupts regardless of the mode. However, in another embodiment, interrupts sources may be distributed to cache domains and processing elements in a performance mode and not in a power mode.

In flow 340 interrupts assigned or distributed to the physical processor are distributed among cache domains of the processor. In one embodiment, the cache domains are the lowest-level caches shared by multiple processing elements. As an example, interrupts are distributed to cache domains of level-two data caches shared by cores. In another embodiment, cache domains include a first level data cache shared by threads. Similar to distribution among physical processors in a performance mode, distribution among cache domains may also be based on previous mapping/association, numa affinity, and fair distribution over the cache domains.

In flow 350 a selective high rate or a number of high rate/activity interrupt sources are further distributed to specific processing elements, such as cores or threads. As stated above, each class or category may be associated with a different threshold for determining high activity. For example, an Ethernet category may be associated with a higher threshold than a storage category. In response to determining interrupts are high rate, high in number, and/or high in activity, they may be assigned to specific processing elements. Note that numa affinity, previous mapping/association, and fair distribution may also be taken into account when distributing the selective high rate interrupt sources.

As illustrated above, benefits may be observed by utilizing dual modes of interrupt handling. During low activity periods, a power save mode is utilized to allow other physical processors to enter low power states, while a single processor primarily handles interrupts. However, during high interrupt activity periods, a performance mode is selected, which distributes interrupts among multiple physical processors. This distribution allows the interrupts to be handled in parallel on multiple physical processors resulting in faster service times and a quicker return to normal execution. Furthermore, the interrupts and sources may be grouped and distributed to cache domains and eventually specific processing elements to further provide efficient interrupt handling.

The embodiments of methods, software, firmware or code set forth above may be implemented via instructions or code stored on a machine-accessible or machine readable medium which are executable by a processing element. A machine-accessible/readable medium includes any tangible mechanism that provides .e., stores and/or transmits) information in a form readable by a machine, such as a computer or electronic system. For example, a machine-accessible medium includes random-access memory (RAM), such as static RAM (SRAM) or dynamic RAM (DRAM); read-only memory (ROM); magnetic or optical storage medium; and flash memory devices. As another example, a machine-accessible/readable medium includes any mechanism that receives, copies, stores, transmits, or otherwise manipulates electrical, optical, acoustical or other form of propagated signals (e.g., carrier waves, infrared signals, digital signals); etc including the embodiments of methods, software, firmware or code set forth above.

Reference throughout this specification to "one embodiment" or "an embodiment" means that a particular feature, structure, or characteristic described in connection with the embodiment is included in one embodiment of the present invention and is not required to be present in all discussed embodiments. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A machine accessible storage medium including program code, which, when executed by a machine, causes the machine to perform the operations of:
   determining an amount of interrupt activity during a period of time;
   selecting a first mode of interrupt handling in response to the amount of interrupt activity being above a threshold of interrupt activity for the period of time; and
   distributing a plurality of interrupts among a plurality of integrated circuits in the machine in response to selecting the first mode according to a fair distribution of the plurality of interrupts among the plurality of integrated circuits based on a proximity associated with each of the plurality of interrupts to the plurality of integrated circuits.

2. The machine accessible storage medium of claim 1, wherein determining an amount of interrupt activity during a period of time includes determining an approximate amount of time spent processing interrupts during the period of time.

3. The machine accessible storage medium of claim 1, wherein determining an amount of interrupt activity during a period of time includes determining an amount of interrupt events during the period of time.

4. The machine accessible storage medium of claim 2, wherein the period of time includes a number of consecutive periodic time periods.

5. The machine accessible storage medium of claim 4, further comprising selecting a second mode of interrupt handling in response to the amount of interrupt activity being below a threshold of interrupt activity for the number of consecutive periodic time periods.

6. The machine accessible storage medium of claim 5, wherein the first mode of interrupt handling is a performance mode of interrupt handling and the second mode of interrupt handling is a power save mode of interrupt handling.

7. The machine accessible storage medium of claim 5, further comprising assigning the plurality of interrupts primarily to one of the plurality of integrated circuits in the machine in response to selecting the second mode.

8. The machine accessible storage medium of claim 7, further comprising overflowing at least one of the plurality of interrupts to a second integrated circuit of the plurality of integrated circuits in the machine in response to the plurality of interrupts being over a threshold number of interrupts.

9. The machine accessible storage medium of claim 1, wherein distributing a plurality of interrupts among a plurality of integrated circuits according to a fair distribution is further based on an additional interrupt handling factor, which is selected from a group consisting of a previous distribution of an interrupt source to an integrated circuit of the plurality of integrated circuits.

10. The machine accessible storage medium of claim 9, wherein the plurality of integrated circuits include a plurality of physical processors, and wherein distributing a plurality of interrupts across a plurality of physical processors according to a fair distribution of the plurality of interrupts among the plurality of physical processors includes:
  distributing the plurality of interrupts among a plurality of cache domains associated with each of the plurality of physical processors based on a fair distribution of the plurality of interrupts among the plurality of cache domains; and
  distributing further a selective number of the plurality of interrupts to cores of the physical processors based on a fair distribution of the selective number of the plurality of interrupts among the cores of the physical processors.

11. A system comprising:
  a plurality of integrated circuits, each integrated circuit including a cache memory shared by a plurality of processing elements; and
  a memory to store program code, when executed by at least one of the plurality of processing elements, to:
    select a performance mode of interrupt handling in response to an amount of interrupt activity being above a threshold;
    distribute a plurality of interrupt sources between a plurality of physical processors in response to selecting the performance mode of interrupt handling based on a proximity associated with each of the plurality of interrupts to the plurality of integrated circuits.

12. The system of claim 11, wherein the program code, when executed by the at least one of the plurality of processing elements, is further to:
  determine if a plurality of interrupts are to be handled in a power save mode;
  assign handling of the plurality of interrupts to a first integrated circuit of the plurality of integrated circuits in response to determining the plurality of interrupts are to be handled in the power save mode; and
  assign selected source interrupts of the plurality interrupts to a processing element included in the first integrated circuit based on fair distribution of the plurality of interrupts among the plurality of processing elements.

13. The system of claim 12, wherein to determine if a plurality of interrupts are to be handled in a power save mode comprises:
  determining an amount of interrupt activity over a first number of periods of time; and
  determining the plurality of interrupts are to be handled in a power save mode in response to the amount of interrupt activity being below a threshold of interrupt activity for each of the first number of periods of time.

14. The system of claim 13, wherein the program code, when executed by the at least one of the plurality of processing elements, is further to: assign a number of the plurality of interrupts assigned to the first integrated circuit of the plurality of integrated circuits to a first cache domain of the first integrated circuit, wherein the selected source interrupts are included in the number of plurality of interrupts.

15. The system of claim 14, wherein the plurality of integrated circuits are physical processors, the plurality of processing elements are cores of the plurality of physical processors, and the first cache domain includes the cache memory shared by the plurality of cores included in the first physical processor.

16. A method comprising:
  selecting a performance mode of interrupt handling in response to an amount of interrupt activity being above a threshold;
  distributing a plurality of interrupt sources between a plurality of physical processors in response to selecting the performance mode of interrupt handling based on a proximity associated with each of the plurality of interrupts to the plurality of integrated circuits;
  distributing a first number of interrupt sources of the plurality of interrupt sources, which were distributed to a first processor of the plurality of physical processors, between cache domains of the first processor; and
  assigning a selective high rate interrupt source of the first number of interrupt sources to a processing element of the first processor.

17. The method of claim 16, further comprising:
  selecting a power save mode of interrupt handling in response to an amount of interrupt activity being below a threshold for a number of consecutive periods; and
  distributing the plurality of interrupt sources to the first physical processor in response to selecting the power save mode of interrupt handling.

18. The method of claim 17, further comprising: grouping the plurality of interrupt sources into a plurality of groups of interrupt sources before distributing the plurality of interrupt sources.

19. The method of claim 18, wherein the plurality of groups are based on categories of interrupt sources.

20. The method of claim 18, wherein the plurality of groups are based on activity level of interrupt sources.

21. The method of claim 16, wherein distributing a plurality of interrupt sources between a plurality of physical processors in response to selecting the performance mode of interrupt handling is based on fair distribution of the plurality of interrupt sources, numa affinity of the plurality of interrupt sources, and existing mapping of the plurality of interrupt sources.

22. The method of claim 16, wherein distributing a plurality of interrupt sources between a plurality of physical processors in response to selecting the performance mode of interrupt handling is biased towards retaining association of the plurality of interrupt sources with previously assigned physical processors of the plurality of physical processors.

23. The method of claim 22, wherein distributing a first number of interrupt sources of the plurality of interrupt sources, which were distributed to a first processor of the plurality of physical processors, between cache domains of the first processor is biased towards retaining association of the first number of interrupt sources with previously assigned cache domains of the first processor, and wherein assigning a selective high rate interrupt source of the first number of interrupt sources to a processing element of the first processor is biased towards retaining association of the selective high rate interrupt source with a previously assigned processing element of the first processor.

24. A machine readable storage medium including program code, which when execution by a machine, causes the machine to perform the method of claim 16.

25. A machine readable storage medium including program code, which when execution by a machine, causes the machine to perform the method of claim 17.

26. A machine readable storage medium including program code, which when execution by a machine, causes the machine to perform the method of claim 21.

27. A machine readable storage medium including program code, which when execution by a machine, causes the machine to perform the method of claim 23.

* * * * *